US010467259B2

(12) United States Patent
Suleman et al.

(10) Patent No.: US 10,467,259 B2
(45) Date of Patent: Nov. 5, 2019

(54) METHOD AND SYSTEM FOR CLASSIFYING QUERIES

(71) Applicant: Maluuba Inc., Tornoto (CA)

(72) Inventors: Kaheer Suleman, Cambridge (CA); Jing He, Kitchener (CA); Tavian Barnes, Waterloo (CA)

(73) Assignee: Maluuba Inc., Toronto, ON (CA)

( * ) Notice: Subject to any disclaimer, the term of this patent is extended or adjusted under 35 U.S.C. 154(b) by 366 days.

(21) Appl. No.: 15/319,747

(22) PCT Filed: Jun. 16, 2015

(86) PCT No.: PCT/CA2015/000388
§ 371 (c)(1),
(2) Date: Dec. 16, 2016

(87) PCT Pub. No.: WO2015/192210
PCT Pub. Date: Dec. 23, 2015

(65) Prior Publication Data
US 2017/0140027 A1 May 18, 2017

Related U.S. Application Data
(60) Provisional application No. 62/013,289, filed on Jun. 17, 2014.

(51) Int. Cl.
*G06F 16/28* (2019.01)
*G06F 16/245* (2019.01)
(Continued)

(52) U.S. Cl.
CPC ......... *G06F 16/285* (2019.01); *G06F 16/245* (2019.01); *G06F 16/353* (2019.01); *G06N 7/005* (2013.01)

(58) Field of Classification Search
CPC .... G06F 16/285; G06F 16/353; G06F 16/245; G06F 16/90332; G06F 17/278;
(Continued)

(56) References Cited

U.S. PATENT DOCUMENTS 7,089,226 B1* 8/2006 Dumais ................. G06F 16/35
707/740
7,490,071 B2 2/2009 Milenova et al.
(Continued)

FOREIGN PATENT DOCUMENTS

CN 10-3514170 1/2014
WO 2014098604 6/2014

OTHER PUBLICATIONS

PCT International Search Report and Written Opinion in PCT/CA2015/000388, dated Sep. 11, 2015, 12 pages.
(Continued)

Primary Examiner — Evan Aspinwall

(57) ABSTRACT

A server, method, and non-transitory computer readable medium for classifying a query into one of a plurality of classes are provided. The server includes a network interface, a memory storage unit and a processor. The method involves receiving a query applying a plurality of support vector machine models, calculating a probability, and determining a top class. The non-transitory computer readable medium is encoded with codes to direct a processor to carry out the method.

20 Claims, 3 Drawing Sheets

(51) Int. Cl.
*G06N 7/00* (2006.01)
*G06F 16/35* (2019.01)

(58) Field of Classification Search
CPC .. G06N 7/005; G06K 9/6231; G06K 9/00422; G06K 9/623; G06K 9/628; G06K 9/6292
USPC ........................................................ 707/737
See application file for complete search history.

(56) References Cited

U.S. PATENT DOCUMENTS

| | | | |
|---|---|---|---|
| 7,707,132 B2 | 4/2010 | Xie et al. | |
| 8,386,401 B2 | 2/2013 | Virkar et al. | |
| 8,560,539 B1 | 10/2013 | Engebretsen | |
| 2010/0280981 A1* | 11/2010 | Kato | G06F 16/90339 706/20 |
| 2010/0306144 A1* | 12/2010 | Scholz | G06N 20/00 706/20 |
| 2012/0039527 A1 | 2/2012 | Qi et al. | |
| 2014/0279774 A1 | 9/2014 | Wang et al. | |
| 2014/0321851 A1 | 10/2014 | Tholiya et al. | |
| 2014/0372351 A1* | 12/2014 | Sun | G06F 16/353 706/12 |

OTHER PUBLICATIONS

PCT International Preliminary Report on Patentability in PCT/CA2015/000388, dated Dec. 20, 2016, 9 pages.

\* cited by examiner

METHOD AND SYSTEM FOR CLASSIFYING QUERIES

CROSS-REFERENCE TO RELATED APPLICATION

This application is a U.S. National Stage Application of PCT/CA2015/000388, filed Jun. 16, 2015, which claims the benefit of U.S. Provisional Patent Application No. 62/013,289, filed Jun. 17, 2014, which applications are hereby incorporated herein by reference in their entireties. To the extent appropriate, a claim of priority is made to each of the above disclosed applications.

FIELD

The present specification relates to servers and methods for receiving queries, and more particularly to servers and methods for classifying a query into one of a plurality of classes.

BACKGROUND

Various method and systems for processing queries received at a client device have been developed. When processing a query, it is sometimes desired to classify the query into one of two or more classes. One such manner of processing queries can involve applying a support vector machine between classes to generate votes. It is to be appreciated that for multiple classes, two or more classes can receive the same number of votes resulting in a tie.

SUMMARY

In accordance with an aspect of the specification, there is provided a server for classifying a query into one of a plurality of classes. The server includes a network interface for receiving a query for classification. Furthermore, the server includes a memory storage unit for storing the query. In addition, the server includes a processor in communication with the network interface and the memory storage unit. The processor is configured to retrieve a query from the memory storage unit and apply a plurality of support vector machine models to generate a plurality of votes for the query. Each vote of the plurality of votes is configured to indicate an assignment to a class selected from the plurality of classes. The processor is further configured to calculate a probability for each of the plurality of classes. The probability is associated with support vector machine scores between the each of the plurality of classes and the remaining classes. The processor is also configured to determine a top class from the plurality of classes. The top class is based on a greatest number of votes and the probability.

The processor may be configured to add a number of votes associated with each class to the probability for each corresponding class to determine the top class.

The plurality of votes may be generated based on a support vector machine score between two classes.

The support vector machine score mat be normalized using a sigmoid function.

The support vector machine score may be calculated using a binary support vector machine.

The probability for each of the plurality of classes may be a product of a plurality of support vector machine scores associates with the each of the plurality of classes.

The processor may be further configured to determine at least one highest vote class of the plurality of classes having a greatest number of votes.

The processor may be further configured to determine whether the at least one highest vote class comprises more than one class of the plurality of classes.

The processor may be further configured to determine the top class by selecting the top class from the more than one highest vote classes.

In accordance with an aspect of the specification, there is provided a method of classifying a query into one of a plurality of classes. The method involves receiving a query for classification. Furthermore, the method involves applying a plurality of support vector machine models to generate a plurality of votes for the query. Each vote of the plurality of votes is configured to indicate an assignment to a class selected from the plurality of classes. In addition, the method involves calculating a probability for each of the plurality of classes. The probability is associated with support vector machine scores between the each of the plurality of classes and the remaining classes. Also, the method involves determining a top class from the plurality of classes. The top class is based on a greatest number of votes and the probability.

Determining the top class may involve adding a number of votes associated with each class to the probability for each corresponding class.

The plurality of votes may be generated based on a support vector machine score between two classes.

The support vector machine score mat be normalized using a sigmoid function.

The support vector machine score may be calculated using a binary support vector machine.

The probability for each of the plurality of classes may be a product of a plurality of support vector machine scores associates with the each of the plurality of classes.

The method may further involve determining at least one highest vote class of the plurality of classes having a greatest number of votes.

Determining whether the at least one highest vote class may involve more than one class of the plurality of classes.

Determining the top class may involve selecting the top class from the more than one highest vote classes.

In accordance with an aspect of the specification, there is provided a non-transitory computer readable medium encoded with codes for classifying a query into one of a plurality of classes. The codes are for directing a processor to receive a query for classification. Furthermore, the codes are for directing a processor to apply a plurality of support vector machine models to generate a plurality of votes for the query. Each vote of the plurality of votes is configured to indicate an assignment to a class selected from the plurality of classes. In addition, the codes are for directing a processor to calculate a probability for each of the plurality of classes. The probability is associated with support vector machine scores between the each of the plurality of classes and the remaining classes. Also, the codes are for directing a processor to determine a top class from the plurality of classes. The top class is based on a greatest number of votes and the probability.

BRIEF DESCRIPTION OF THE DRAWINGS

Reference will now be made, by way of example only, to the accompanying drawings in which.

DETAILED DESCRIPTION OF THE EMBODIMENTS

Figure 1:
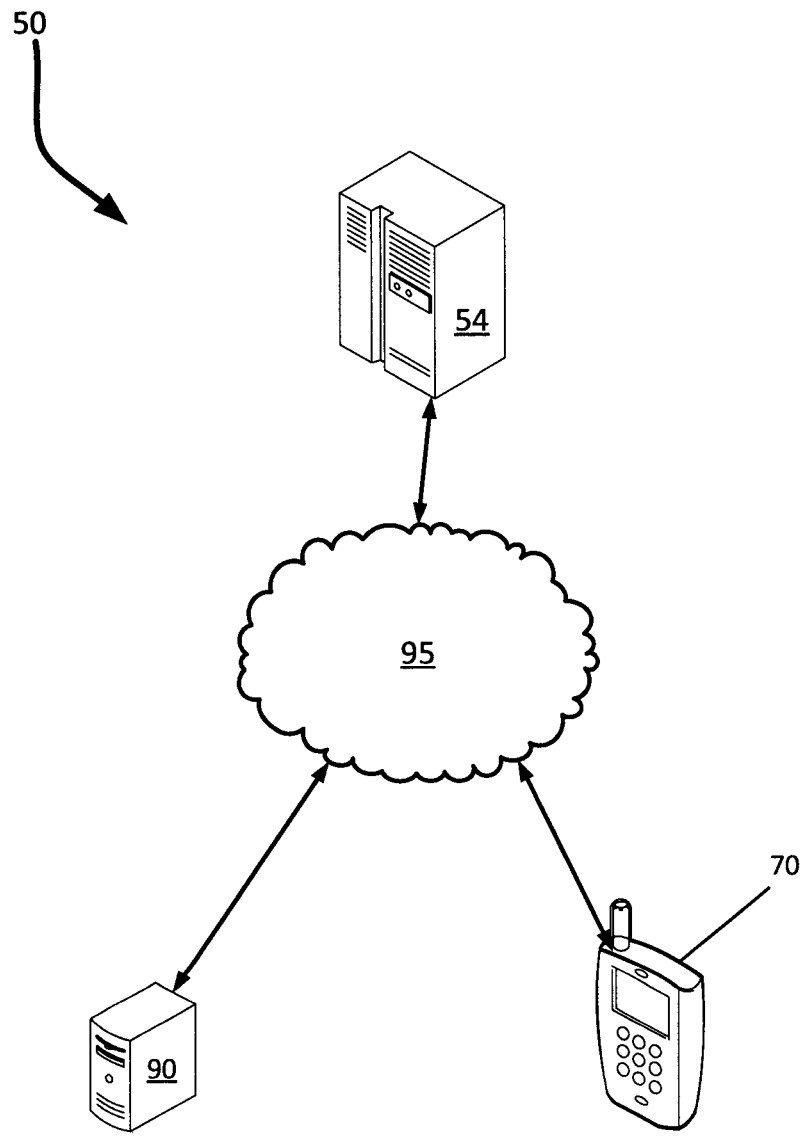
FIG. 1 is a schematic representation of a system for classifying a query into one of a plurality of classes in accordance with an embodiment.

Referring to FIG. 1, a schematic representation of a computer network system is shown generally at 50. It is to be understood that the system 50 is purely exemplary and it will be apparent to those skilled in the art that a variety of computer network systems are contemplated. The system 50 includes a server 54, a client device 70, and a data source 90 for providing information. The server 54, the client device 70, and the data source 90 are connected by a network 95. The network 95 is not particularly limited and can include any type of network such as the Internet, an intranet or a local area network, a mobile network, or a combination of any of these types of networks. In some embodiments, the network 95 can also include a peer to peer network.

In the present embodiment, the server 54 can be any type of computing device generally used to receive input, process the input and provide output. The server 54 is not particularly limited and can include a variety of different devices depending on the specific application of the server 54. For example, the server 54 can be optimized for its specific role in the system 50, such as for communicating with the client device 70 and the data source 90. Suitable devices the server 54 can include high performance blade server systems running UNIX operating systems, and having multiple processors. Alternatively, the server 54 can include devices such as a personal computer, a personal digital assistant, a tablet computing device, cellular phone, or laptop computer configured to carry out similar functions for systems not requiring a server with significant processing power. In other embodiments, the server 54 can also be implemented as a virtual server, a rented server session in the cloud, or any combination of the above.

The client device 70 can be any type of computing device used to communicate with the server 54 over the network 95 for generally submitting queries. It is to be appreciated that, in general, the client device 70 includes programming instructions in the form of codes stored on a computer readable medium for performing the functions, such as in the form of a downloadable application. For example, the client device 70 can be any one of a personal computer, a laptop computer, a portable electronic device, a gaming device, a mobile computing device, a portable computing device, a tablet computing device, a personal digital assistant, a cell phone, or a smart phone. In the present embodiment, the client device 70 is generally configured to send a query to the server 54 and to receive information from the server 54 in response to the query. The query is not particularly limited and can be any type of query, such as a request for information from the data source 90 or an instruction to control the client device 70.

In the present embodiment, the data source 90 is generally configured to provide information upon receiving a query. The manner by which the data source 90 operates is not particularly limited. For example, in the present embodiment, the data source 90 can be associated with a service provider. In particular, the data source 90 can be associated with a service provider that offers a database of general businesses, such as restaurants, hotels, theatres, etc. for which a user at the client device 70 may want to search or obtain more information. It is to be appreciated, with the benefit of this description, that although a single data source 90 is shown in FIG. 1, it is not necessarily limited to the data source 90. For example, in other embodiments, the system 50 can be modified to include a plurality of data sources where each data source can provide complimentary information or overlapping information. In further embodiments, the data source 90 can also be modified to be part of a database within the server 54, or can be omitted altogether when no external information is requested, such as for a query sent from the client device 70 to the server 54 to control a local feature of the client device 70, such as starting an application, editing a calendar event, adjusting the volume, etc.

It is to be re-emphasized that the system 50 described above is a non-limiting representation only. For example, although the network 95 of the present embodiment shown in FIG. 1 connects the server 54, the client device 70, and the data source 90, other embodiments can include separate networks for connecting the server 54 to the client device 70, and the server 54 to the data source 90.

Figure 2:
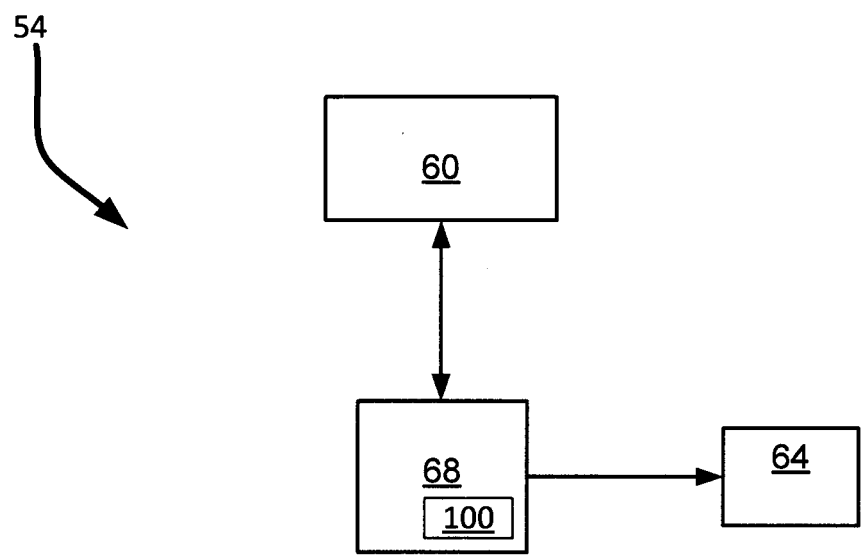
FIG. 2 is a schematic representation of a server in accordance with the embodiment shown in FIG. 1.

Referring to FIG. 2, a schematic block diagram showing various components of the server 54 is provided. It should be emphasized that the structure in FIG. 2 is purely exemplary and several different implementations and configurations for the server 54 are contemplated. The first server 54 includes a network interface 60, and a memory storage unit 64, and a processor 68.

The network interface 60 is not particularly limited and can include various network interface devices such as a network interface controller (NIC) capable of communicating with the client device 70 and the data source 90 across the network 95. In the present embodiment, the network interface 60 is generally configured to connect to the network 95 via a standard Ethernet connection.

The memory storage unit 64 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). In the present embodiment, the memory storage unit 64 is generally configured to temporarily store queries received from the client device 70 for processing as well as any queries that may need to sent on to the data source 90. In addition, the memory storage unit 64 is configured to store codes for directing the processor 68 for carrying out computer implemented methods. For example, the codes can include the programming instructions 100 further described below.

The processor 68 is not particularly limited and is generally configured to execute programming instructions 100 for classifying queries. The manner by which the queries are classified is not particularly limited and will be discussed in greater detail below. For example and to provide greater clarity to the understanding of the present embodiment, it can be assumed that the query can be classified into one of a plurality of classes using natural language processing techniques.

In the present embodiment, the programming instructions 100 include a natural language processing engine. It is to be appreciated that several different types of natural language processing engines are contemplated. For example, the natural language processing engine can be based on support vector machine analysis, decision trees, Bayesian networks, neural networks, or any combination thereof. In general, the server 54 receives a query from the client device 70 via the network interface 60 and the programming instructions 100 analyze the query to derive classes such as an intention and/or specific commands. The manner by which the query is received is not particularly limited. For example, the query can be in the form of a text string or an audio file.

Figure 3:
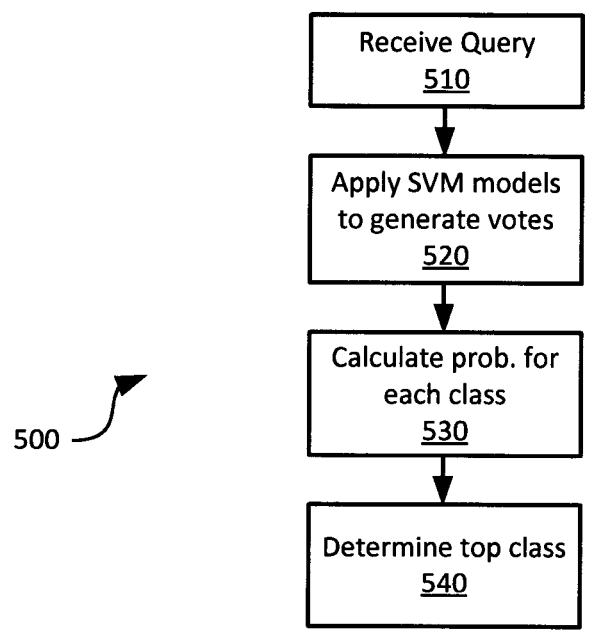
FIG. 3 is a flow-chart of a method of classifying a query into one of a plurality of classes in accordance with an embodiment.

Referring to FIG. 3, a method of classifying a query into one of a plurality of classes is represented in the form of a flow-chart and indicated generally at 500. In order to assist in the explanation of the method 500, it will be assumed that the method 500 is performed using the system 50. Furthermore, the following discussion of the method 500 will lead to further understanding of the system 50 and its various components. In particular, it is to be understood that in one embodiment, the programming instructions 100 of the server 54 direct the processor 68 to carry out the methods discussed below. However, it is to be understood that the system 50 and/or the method 500 can be varied, and need not work exactly as discussed herein in conjunction with each other, and that such variations are within the scope of the present invention. Furthermore, it is to be emphasized, that method 500 need not be performed in the exact sequence as shown and that various blocks can be performed in parallel rather than in sequence; hence the elements of the method 500 are referred to herein as "blocks" rather than "steps".

Block 510 comprises receiving a query for classification at the server 54 from the client device 70. In the present embodiment, the query comprises a text string received from the client device 70; however, it is to be appreciated, with the benefit of this specification, that the manner by which a query is received is not particularly limited. For example, the query can be received in other formats such as an audio file, an image file, a proprietary format, or in an encrypted format. Furthermore, the query can also be received in a pre-processed format from the client device 70.

It is to be appreciated, with the benefit of this description, that the query is ultimately associated with input at the client device 70. The origin of the input is not particularly limited and can be a user of the device or the output of another electronic device. The input received at the client device 70 is not particularly limited and can include sounds received through a speaker, data received via an input device such as a keyboard, images captured using a camera, or data received from another electronic device. In the present embodiment, the input received at the client device 70 is pre-processed into a normalized format to aid in classification at the server 54. However, it is to be appreciated that in other embodiments, the raw input can be forwarded to the server 54 for direct processing or pre-processing at the server 54.

It is to be appreciated that several variations for receiving a query can be considered. Furthermore, it is also to be appreciated that the server 54 can be offered separately to third parties who provide the server 54 with queries and receive a classification in return.

Block 520 comprises applying a plurality of support vector machine models to the query. It is to be appreciated that each application of a support vector machine model makes a binary determination of which of two classes the query is more likely to be classified. In the present embodiment, there are a finite number of classes and a support vector machine model between every possible combination of classes. For example, if the present embodiment includes three possible classes for the queries: X, Y, and Z, a support vector machine model between every possible combination of classes. Accordingly in the present embodiment, three possible support vector machine scores are generated: $SVM_{xy}$, $SVM_{xz}$, and $SVM_{yz}$. It is to be appreciated that the support vector machine scores $SVM_{xy}$, $SVM_{xz}$, and $SVM_{yz}$ are not particularly limited and can be arbitrary index values or normalized values. For example, the support vector machine scores $SVM_{xy}$, $SVM_{xz}$, and $SVM_{yz}$ can be normalized using a sigmoid function or other type of function.

The manner by which the support vector machine scores $SVM_{xy}$, $SVM_{xz}$, and $SVM_{yz}$ are calculated is not particularly limited. For example, the score can be calculated using a standard binary support vector machine.

Each of the scores $SVM_{xy}$, $SVM_{xz}$, and $SVM_{yz}$ can be used generate a vote indicating whether the query should be classified into one class or the other. For example, $SVM_{xy}$ can provide an indication of whether the query should be classified into class X or class Y. Similarly, $SVM_{xz}$ can provide an indication of whether the query should be classified into class X or class Z, and $SVM_{yz}$ can provide an indication of whether the query should be classified into class Y or class Z. Accordingly, in the present example, three votes would be generated where each vote provides an indication that the query should be assigned to a specific case.

Continuing with the present example, if it is assumed that $SVM_{xy}$ indicates that the query should be classified in class X over class Y, $SVM_{xz}$ indicates that the query should be classified in class X over class Z, and $SVM_{yz}$ indicates that the query should be classified in class Z over class Y, two votes for class X are generated and one vote for class Z is generated. In this scenario the server 54 can classify the query in class X since there are more votes for class X than any other class. In other words, class X can be considered as the highest vote class having the greatest number of votes.

In another scenario, if it is assumed that $SVM_{xy}$ indicates that the query should be classified in class X over class Y, $SVM_{xz}$ indicates that the query should be classified in class Z over class X, and $SVM_{yz}$ indicates that the query should be classified in class Y over class Z, one vote would be generated for each of class X, class Y, and class Z. It is to be appreciated that in this scenario, a tie has occurred and the vote system would not be able to make a determination of a top class based solely on the number of votes. Accordingly, since each of class X, class Y, and class Z have a single vote, they can all be considered the highest vote class in this scenario since they each have the greatest number of votes, which in this scenario is one.

Block 530 comprises calculating a probability score P(class) for each of the available classes in the finite number of classes. The manner by which the probability score P(class) is calculated is not particularly limited and variations are contemplated. In the present embodiment, the probability score P(class) for each class is associated with all the support vector machine scores for that class compared with the remaining classes. Continuing with the example above, the probability score for class X, P(X), would be determined based on $SVM_{xy}$ and $SVM_{xz}$, the probability score for class Y, P(Y), would be determined based on $SVM_{xy}$ and $SVM_{yz}$, and the probability score for class Z, P(Z), would be determined based on $SVM_{xz}$ and $SVM_{yz}$. The manner by which the probability score P(class) is calculated is not particularly limited. For example, in the present embodiment, the probability score P(class) can be calculated as a simple product of the appropriate support vector machine scores $SVM_{xy}$, $SVM_{xz}$, and $SVM_{yz}$ or the inverse thereof. In other examples, the probability score P(class) can be normalized to be a probability of the associated class being the top class Block 540 comprises determining the top class from the finite number of classes based on the number of votes generated in block 520 and the probability score for each class calculated in block 530. It is to be appreciated that the determination is not particularly limited and can include various methods and calculations involve the number of votes and/or the probability score for each class. For example, in one embodiment, the determination of the top class can rely solely on the number of votes unless a tie is presented. Accordingly, in this example, the execution of block 530 may not be necessary and can be skipped when the votes can be used to determine the top class without using the probability scores.

In other embodiments, the probability score P(class) for each class can be added to the number of votes obtained for each class. Accordingly, it is to be appreciated that in embodiments where the probability score P(class) is normalized between zero and one, the probability score P(class) will serve as a tie-breaker only when the number of votes is equal since the probability score P(class) will always be less than one. It is to be appreciated by a person of skill in the art, that this embodiment can provide for simpler programming since the same calculation is carried out in all scenarios, but more computational taxing as potentially unnecessary calculations are performed when the votes do not indicate a tie.

It is to be appreciated by a person of skill in the art, with the benefit of this description, that the probability score can also be used to indicate the confidence level for the specific classification. For example, if the top class were to be determined with a relatively low P(class), it can be understood that the classification may not be correct. For example, in some embodiments, even though a top class is determined, the top class can be required to meet a predetermined minimum threshold of confidence in order to be classified. In scenarios where the top class fails to meet the predetermined minimum threshold of confidence, the server 54 can request further clarification of the query or return an error.

While specific embodiments have been described and illustrated, such embodiments should be considered illustrative only and should not serve to limit the accompanying claims.

What is claimed is:

1. A server for classifying a query into one of a plurality of classes, the server comprising:
   a network interface configured to receive the query for classification;
   a memory storage unit for storing the query; and
   a processor in communication with the network interface and the memory storage unit, the processor configured to:
      receive the query from the memory storage unit;
      identify a plurality of classes associated with the query;
      apply a plurality of support vector machine models to each pair of classes of the plurality of classes to generate a plurality of class selections for the query, wherein a support vector machine score for each pair of classes represents that one class of a class pair matches the query more closely than the other class of the class pair, and wherein each class selection of the plurality of class selections indicates the class of the class pair that matches the query more closely than the other class of the class pair of the plurality of classes;
      generate a set of probabilities that each of the plurality of classes will match the query, each probability associated with support vector machine scores between each class of the plurality of classes and the remaining classes; and
      determine a closest matching class from the plurality of classes for the query, wherein the closest matching class has the highest score based on a combined score of a number of class selections and a normalized support vector machine score representing a probability that the class will match the query based on the set of probabilities.

2. The server of claim 1, wherein the processor is configured to determine a combined score for a class by adding a number of class selections associated with each class to the probability for the class.

3. The server of claim 1, wherein the support vector machine score is normalized using a sigmoid function.

4. The server of claim 3, wherein the support vector machine score is calculated using a binary support vector machine.

5. The server of claim 4, wherein the probability for each of the plurality of classes is a product of a plurality of support vector machine scores associated with the each of the plurality of classes.

6. The server of claim 1, wherein the processor is further configured to determine at least one class with the most class selections of the plurality of classes.

7. The server of claim 6, wherein the processor is further configured to determine whether at least two classes have a same number of class selections.

8. The server of claim 7, wherein the processor is further configured to determine the closest matching class among the at least two classes with the same number of class selections based on the normalized support vector machine score.

9. A method of classifying a query into one of a plurality of classes, the method comprising:
   receiving the query;
   identifying a plurality of classes associated with the query;
   applying a plurality of support vector machine models to each possible pair of classes of the plurality of classes to generate a plurality of class selections for the query, wherein a support vector machine score for each pair of classes represents that one class of a class pair matches the query more closely than the other class of the class pair, and wherein each class selection of the plurality of class selections indicates the class of the class pair that matches the query more closely than the other class of the class pair of the plurality of classes;
   generating a set of probabilities that each of the plurality of classes will match the query, each probability associated with support vector machine scores between each class of the plurality of classes and the remaining classes; and
   determining a closest matching class from the plurality of classes for the query, wherein the closest matching class has the highest score based on a combined score of a number of class selections and a normalized support vector machine score representing a probability that the class will match the query based on the set of probabilities.

10. The method of claim 9, wherein determining a combined score for a class comprises adding a number of class selections associated with each class to the probability for the class.

11. The method of claim 9, wherein the support vector machine score is normalized using a sigmoid function.

12. The method of claim 11, wherein the support vector machine score is calculated using a binary support vector machine.

13. The method of claim 12, wherein the probability for each of the plurality of classes is a product of a plurality of support vector machine scores associated with the each of the plurality of classes.

14. The method of claim 9, further comprising determining at least one class with the most class selections of the plurality of classes.

15. The method of claim 14, further comprising determining whether more than one class has a same number of class selections.

16. The method of claim 15, wherein determining the closest matching class among the more than one class having the same number of class selections is based at least on the normalized support vector machine score.

17. A non-transitory computer readable medium encoded with codes for classifying a query into one of a plurality of classes, the codes for directing a processor to:
receive a query;
identify a plurality of classes associated with the query;
apply a plurality of support vector machine models to each pair of classes of the plurality of classes to generate a plurality of class selections for the query, wherein a support vector machine score for each pair of classes represents that one class of a class pair matches the query more closely than the other class of the class pair, and wherein each class selection of the plurality of class selections indicates the class of the class pair that matches the query more closely than the other class of the class pair of the plurality of classes;
generate a set of probabilities that each of the plurality of classes will match the query, each probability associated with support vector machine scores between each class of the plurality of classes and the remaining classes; and
determine a closest matching class from the plurality of classes for the query, wherein the closest matching class has the highest score based on a combined score of a number of class selections and a normalized support vector machine score representing a probability that the class will match the query based on the probabilities.

18. The server of claim 1, wherein the support vector machine score is normalized using a sigmoid function.

19. The method of claim 9, wherein the support vector machine score is normalized using a sigmoid function.

20. The non-transitory computer readable medium of claim 17, wherein the support vector machine score is normalized using a sigmoid function.

* * * * *